(12) United States Patent
Yokogawa et al.

(10) Patent No.: US 7,352,432 B2
(45) Date of Patent: Apr. 1, 2008

(54) LIQUID CRYSTAL DISPLAY DEVICE

(75) Inventors: Shinji Yokogawa, Izumi (JP); Yusuki Nogami, Izumi (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 590 days.

(21) Appl. No.: 10/997,987

(22) Filed: Nov. 29, 2004

(65) Prior Publication Data

US 2005/0122460 A1 Jun. 9, 2005

(30) Foreign Application Priority Data

Nov. 28, 2003 (JP) ............................. 2003-400732

(51) Int. Cl.
*G02F 1/13* (2006.01)
(52) U.S. Cl. ........................................ 349/192; 349/55
(58) Field of Classification Search ................ 349/192, 349/55
See application file for complete search history.

(56) References Cited

U.S. PATENT DOCUMENTS 6,822,701 B1 * 11/2004 Kasahara et al. ............. 349/38
6,989,884 B2 * 1/2006 Te-Cheng .................... 349/192

FOREIGN PATENT DOCUMENTS

| JP | 2-3022 | 1/1990 |
|---|---|---|
| JP | 6-281959 | 10/1994 |
| JP | 11-271808 | 10/1999 |
| JP | 2001-290167 | 10/2001 |
| JP | 2001-345452 | 12/2001 |
| JP | 2002-40484 | 2/2002 |
| JP | 2002-131781 | 5/2002 |
| JP | 2002-365656 | 12/2002 |
| JP | 2003-29282 | 1/2003 |
| JP | 2003-207797 | 7/2003 |

* cited by examiner

*Primary Examiner*—David Nelms
*Assistant Examiner*—Phu Vu
(74) *Attorney, Agent, or Firm*—Young & Thompson

(57) ABSTRACT

A slit portion is provided at the center of a shield common electrode which is overlapped with a drain wire as a different layer. When an interlayer short-circuiting occurs between the drain wire and the shield common electrode, it induces a critical defect on a screen display, however, a line defect can be repaired/extinguished by cutting both the sides of the slit at the short-circuited portion with laser repair and separating the short-circuited portion.

3 Claims, 4 Drawing Sheets

LIQUID CRYSTAL DISPLAY DEVICE

BACKGROUND OF THE INVENTION

1. Technical Field of the Invention

The present invention relates to a liquid crystal display device in which a large number of thin film transistors are arranged together with pixel electrodes, and particularly to a liquid crystal display device using an electrical field applied in the lateral direction.

2. Description of the Related Art

FIG. 1 is a plan view showing a TFT substrate of a conventional liquid crystal display device. FIG. 2 is a cross-sectional view taken along I-I of FIG. 1. First, the conventional liquid crystal display device will be described with reference to FIGS. 1 and 2. A scan line 2 formed of Cr film and a common wire 3 extending in parallel to the scan line 2 are formed on a transparent substrate 1. Subsequently, an insulating film is deposited on the scan line 2 and the common wire 3 so as to cover them. A drain wire 7 for supplying a pixel signal is formed on the insulating film so as cross the scan line 2 and the common wire 3. A drain electrode 8 as a part of the drain wire 7 and a source electrode 9 are connected to a semiconductor layer 6. The source electrode 9 constitutes a storage electrode 10 on the common wire 3, and extends to the center of each pixel to form a pixel electrode 11. The semiconductor layer 6, the drain electrode 8, the source electrode 9 and the scan line 2 below the semiconductor layer 6 constitute a thin film transistor as a switching element 21. Reference numeral 20 denotes a storage.

Subsequently, an interlayer insulating film 13 is formed on the insulating film 5. An upper pixel electrode 14 for applying an electric field to the liquid crystal and a shield common electrode 15 are formed on the interlayer insulating film 13.

At this time, the shield common electrode 15 shields an electric field leaking from the drain wire 7 into the display area of the pixel. The upper pixel electrode 14 and the shield common electrode 15 are formed by patterning the same layer on the interlayer insulating film 13. The upper pixel electrode 14 and the shield common electrode 15 are located to be nearer to the liquid crystal layer 200 than the scan line 2 and the drain wire 7, so that they are located at the uppermost layer as the wire layer and formed of a transparent material such as ITO or the like. The upper pixel electrode 14 is connected to the lower pixel electrode 11 through a contact hole 17 penetrating through the insulating film 13 in the vertical direction. The shield common electrode 15 is likewise connected to the common wire 3 as the lower layer through a contact hole 18 penetrating through the insulating film 13 in the vertical direction.

Thereafter, the upper pixel electrode 14 and the shield common electrode 15 are formed on the interlayer insulating film 13, and then the surface of the display area is covered by an orientation film (not shown) and subjected to a rubbing treatment to form a TFT substrate 100. Furthermore, a color filter (CF) substrate 300 is disposed so as to face the TFT substrate 100, and a liquid crystal layer 200 is sandwiched and held between the TFT substrate 100 and the color filter substrate 300.

However, the conventional liquid crystal display device thus constructed has such a structure that when an interlayer short-circuit occurs between the shield common electrode 15 and the drain wire 7, it is impossible to separate the short-circuited portion by laser cut.

SUMMARY OF THE INVENTION

An object of the present invention is to provide a liquid crystal display device which can separate away a short-circuited portion by laser cut even when an interlayer short-circuiting occurs between a shield common electrode and a drain wire.

A liquid crystal display device according to the present invention comprises: a first substrate; a gate wire and a common wire which are provided in parallel to each other on the first substrate; a first insulating film provided on the first substrate so as to cover the gate wire and the common wire; a drain wire provided on the first insulating film so as to cross the gate wire and the common wire; a second insulating film provided on the first insulating film so as to cover the drain wire; a common electrode and a pixel electrode which are formed of a transparent material and provided on the second insulating film so as to be disposed in parallel and facing each other to form a parallel facing electrode portions; a second substrate disposed so as to face the first substrate; and a liquid crystal layer sandwiched between the first substrate and the second substrate. The common electrode covers the drain wire in the width direction while the width of the common electrode is set to be larger than the width of the drain wire, and is provided with a slit portion (non-electrode portion) at a part of the overlap portion thereof with the drain wire. An electric field is generated between the common electrode and the pixel electrode in the parallel facing electrode portions to rotate liquid crystal molecules of the liquid crystal layer in a plane parallel to the first substrate, thereby making a display.

In this case, it is preferable that the slit portion (non-electrode portion) of the common electrode is disposed to be as near to the common wire as possible. Furthermore, it is preferable that the length of the slit portion of the common electrode in the direction parallel to the drain wire is as small as possible (several micron-m order) to the extent that it can be cut by laser repair.

According to the liquid crystal display device of the present invention, the slit portion (non-electrode portion) is provided in the shield common electrode overlapped with the lower drain wire. Therefore, even when the interlayer short-circuiting occurs between the drain wire and the shield common electrode, it induces a line defect as a critical defect to a display on the screen, however, the line defect can be repaired by cutting both sides of the slit with laser repair to separate the short-circuited portion.

DETAILED DESCRIPTION OF THE PREFERRED EMBODIMENTS

Figure 1:
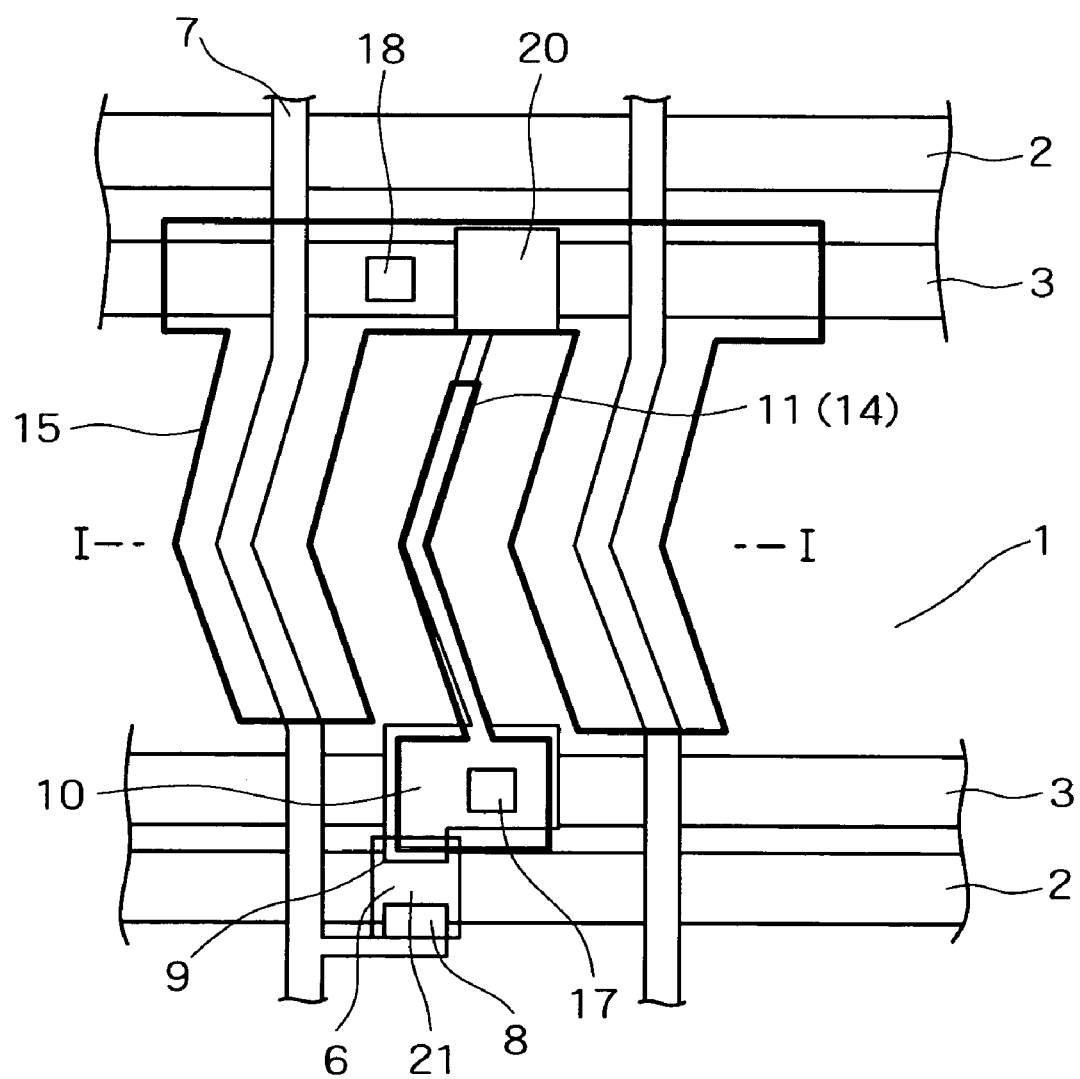
FIG. 1 is a plan view showing a conventional liquid crystal display device.
Figure 2:
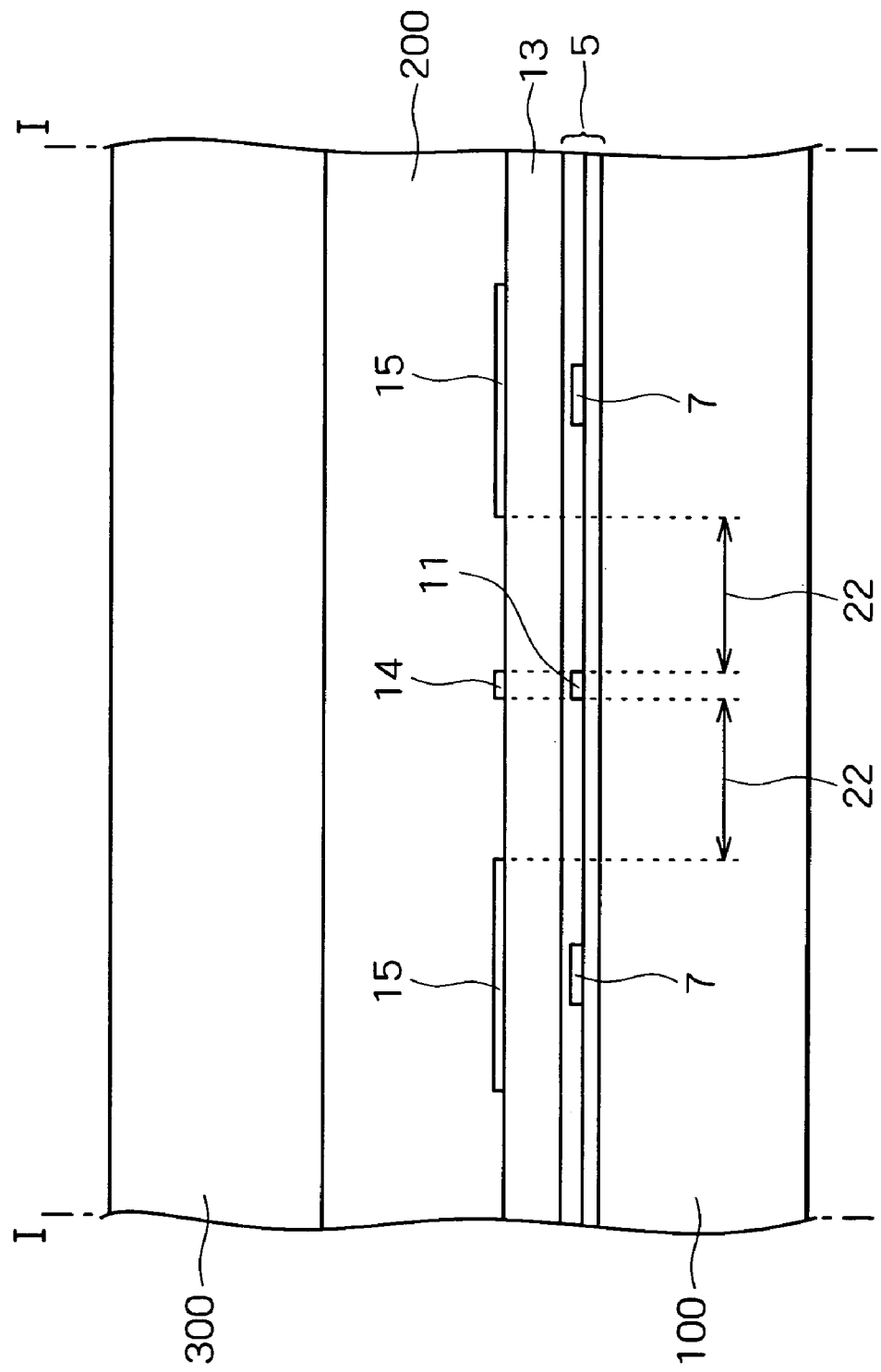
FIG. 2 is a cross-sectional view taken along I-I line of FIG. 1 and FIG. 3.
Figure 3:
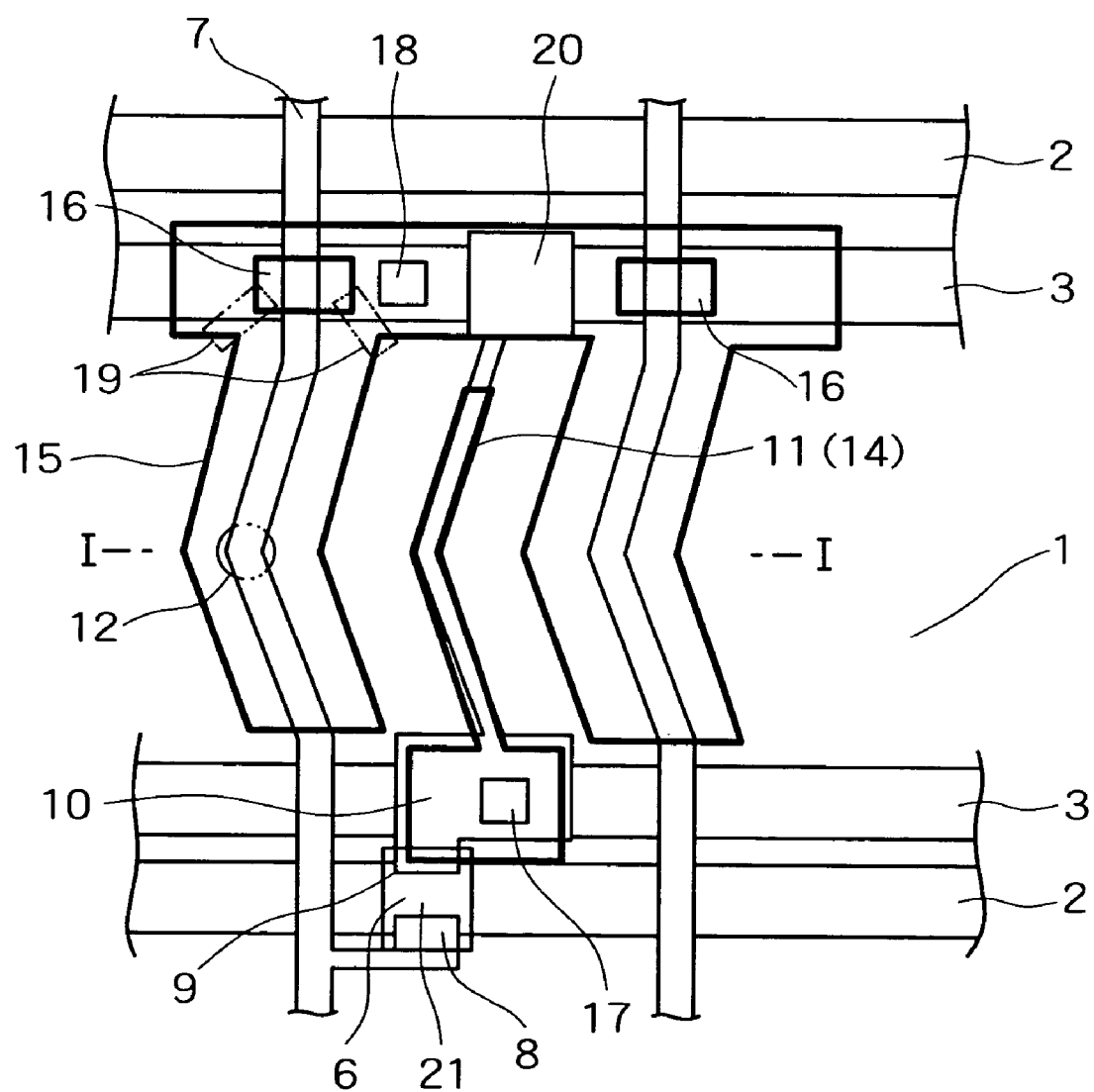
FIG. 3 is a plan view showing a liquid crystal display device according to a first embodiment of the present invention.

A liquid crystal display device according to an embodiment of the present invention will be described with reference to the accompanying drawings. FIG. 3 is a plan view showing a pixel at a TFT substrate of the liquid crystal display device according to the first embodiment of the present invention. FIG. 2 is also a cross-sectional view taken along I-I line of FIG. 3, and it is common to the cross-sectional view taken along I-I line of FIG. 1 showing the conventional liquid crystal display device. In the following embodiment, the pixel electrodes 11, 14 and the common electrode 15 provided in parallel to the pixel electrodes are designed in a V-shaped form. As a matter of course, the present invention may be applied to the pixel electrodes 11, 14 and the common electrode 15 of the linear shape.

A scan line 2 formed of Cr film and a common wire 3 in parallel to the scan line 2 are formed on a transparent substrate 1. Subsequently, insulating film is deposited on the scan line 2 and the common wire 3 so as to cover them and a drain wire 7 for supplying a pixel signal is formed on the insulating film. A drain electrode 8 as a part of the drain wire 7 and a source electrode 9 are connected to a semiconductor layer 6. The source electrode 9 constitutes a storage electrode 10 on the common wire 3, and extends to the center of a pixel to form a pixel electrode 11. The semiconductor layer 6, the drain electrode 8, the source electrode 9 and the scan line 2 below the semiconductor layer 6 constitute a thin film transistor as a switching element 21. Reference numeral 20 represents a storage.

Subsequently, an interlayer insulating film 13 is formed on the insulating film 5. An upper pixel electrode 14 for applying an electric field to a liquid crystal and a shield common electrode 15 are formed on the interlayer insulating film 13.

The shield common electrode 15 shields an electric field leaking from the drain wire 7 into the display area of the pixel. The upper pixel electrode 14 and the shield common electrode 15 are formed by patterning the same layer on the interlayer insulating film 13. The upper pixel electrode 14 and the shield common electrode 15 are located to be nearer to the liquid crystal layer than the scan line 2 and the drain wire 7, so that they are located at the uppermost layer as the wire layer and formed of a transparent material. The upper pixel electrode 14 is connected to the lower pixel electrode 11 through a contact hole 17 penetrating through the insulating film in the vertical direction. The shield common electrode 15 is likewise connected to the lower common wire 3 through a contact hole 18 penetrating through the insulating film in the vertical direction.

Furthermore, the shield common electrode 15 is provided so as to be overlapped with the drain wire 7 formed in the lower layer of the shield common electrode 15, and designed to have a larger width than the drain wire 7. Furthermore, a slit portion 16 is provided in the shield common electrode 15 at the overlap portion with the drain wire 7. The slit portion 16 is a portion lacking the electrode.

The upper pixel electrode 14 and the shield common electrode 15 are formed on the interlayer insulating film 13, and then the surface of the display area is covered by an orientation film (not shown) and subjected to a rubbing treatment to form a TFT substrate 100. Furthermore, a color filter substrate 300 is disposed so as to face the TFT substrate 100, and a liquid crystal layer 200 is sandwiched and held between the TFT substrate 100 and the color filter substrate 300.

The liquid crystal display device thus constructed is a liquid crystal display device in which an electric field is generated between the shield common electrode 15 and the pixel electrode 11 and 14 which are the parallel facing electrode portions to rotate liquid crystal molecules of the liquid crystal layer 200 within a plane parallel to the TFT substrate 100, thereby making a display. The shield common electrode 15 covers the drain wire 7 in the width direction thereof while the width thereof is larger than the width of the drain wire 7, and is provided with the slit portion 16 (non-electrode portion) at a part of the overlap portion with the drain wire 7.

As described above, in the liquid crystal display device according to this embodiment, the slit portion 16 (non-electrode portion) is provided in the shield common electrode 15 overlapped with the lower drain wire 7. In this case, when a short-circuited portion 12 occurs between the shield common electrode 15 and the drain wire 17 due to some factor in a process, it appears as a line defect of the drain wire 7 serving as a critical defect on the display of the screen. Therefore, laser cut is applied to both sides of the slit portion 16 as indicated at laser cut portions 19, and the short-circuited portion 12 of the shield common electrode 15 can be separated, so that the line defect can be extinguished/repaired.

Figure 4:
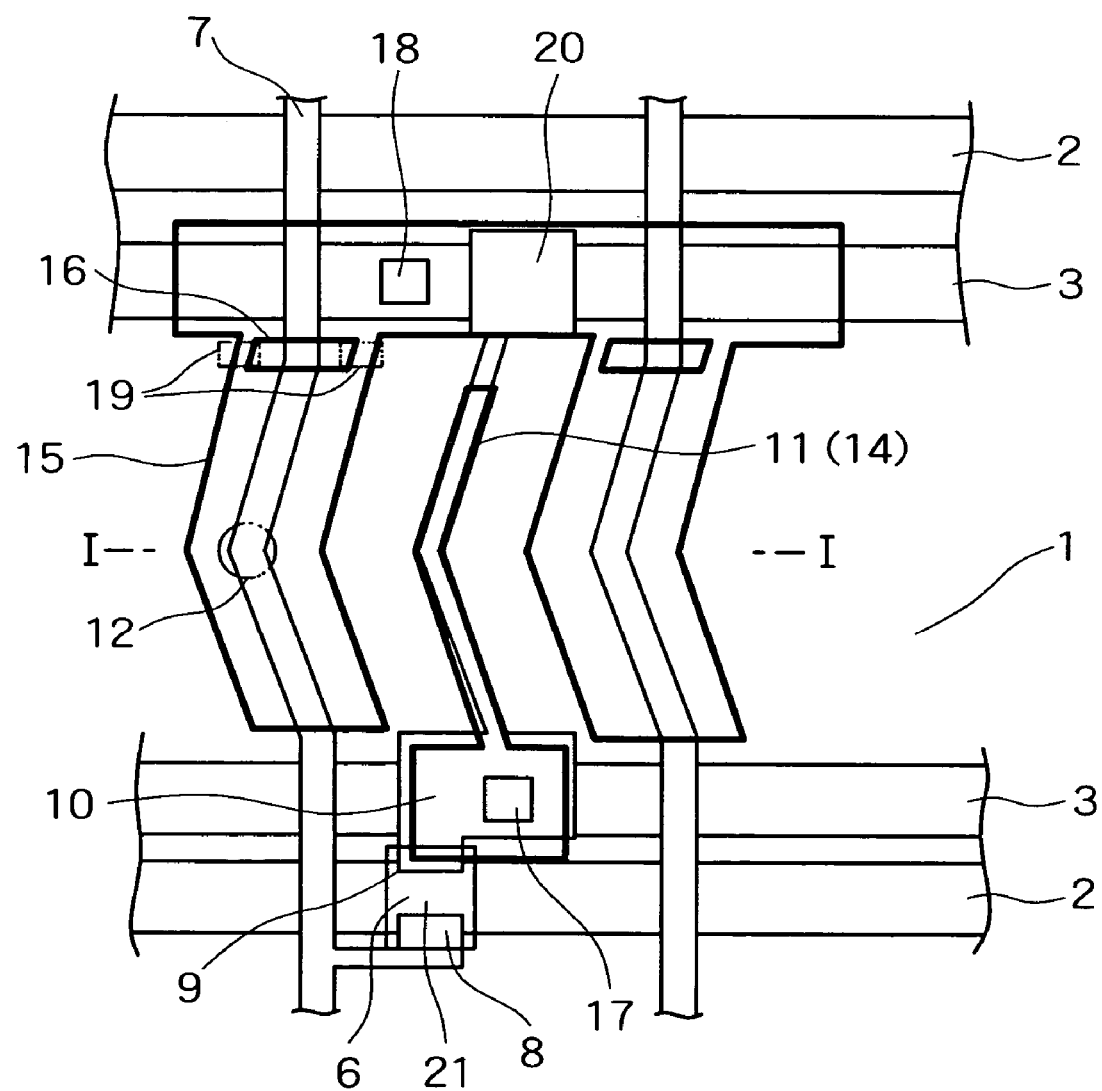
FIG. 4 is a plan view showing a liquid crystal display device according to a second embodiment of the present invention.

Next, a liquid crystal display device according to a second embodiment of the present invention will be described with reference to a plan view of FIG. 4. This embodiment is for the case in which the slit portion 16 (non-electrode portion) provided in the shield common electrode 15 cannot be disposed on the common wire 3 for some reason. In the embodiment, the slit portion 16 is disposed so as to be as near to the common wire 3 as possible. In this embodiment, laser cut is also applied to both sides of the slit portion 16 as indicated at laser cut portions 19, and the short-circuited portion 12 of the shield common electrode 15 can be separated, so that the line defect can be extinguished/repaired. The second embodiment has the same action and effect as the first embodiment.

What is claimed is:

1. A liquid crystal display device, comprising:
   a first substrate;
   a gate wire and a common wire which are provided in parallel to each other on the first substrate;
   a first insulating film provided on the first substrate so as to cover the gate wire and the common wire;
   a drain wire provided on the first insulating film so as to cross the gate wire and the common wire;
   a second insulating film provided on the first insulating film so as to cover the drain wire;
   a common electrode and a pixel electrode which are formed of a transparent material and provided on the second insulating film so as to be disposed in parallel and facing each other to form a parallel facing electrode portions, the common electrode covering the drain wire in the width direction while the width of the common electrode is set to be larger than the width of the drain wire, and being provided with a slit portion (non-electrode portion) at a part of the overlap portion thereof with the drain wire;
   a second substrate disposed so as to face the first substrate; and
   a liquid crystal layer sandwiched between the first substrate and the second substrate,
   wherein an electric field is generated between the common electrode and the pixel electrode in the parallel facing electrode portions to rotate liquid crystal molecules of the liquid crystal layer in a plane parallel to the first substrate, thereby making a display.

2. The liquid crystal display device according to claim 1, wherein the slit portion (non-electrode portion) of the common electrode is disposed to be as near to the common wire as possible.

3. The liquid crystal display device according to claim 2, wherein the length of the slit portion of the common electrode in the direction parallel to the drain wire is as small as possible to the extent that the slit portion can be cut by laser repair.

* * * * *